April 18, 1933.    J. L. HECHT    1,904,458
METHOD OF MAKING TENSION WHEELS
Filed Nov. 13, 1931    2 Sheets-Sheet 1
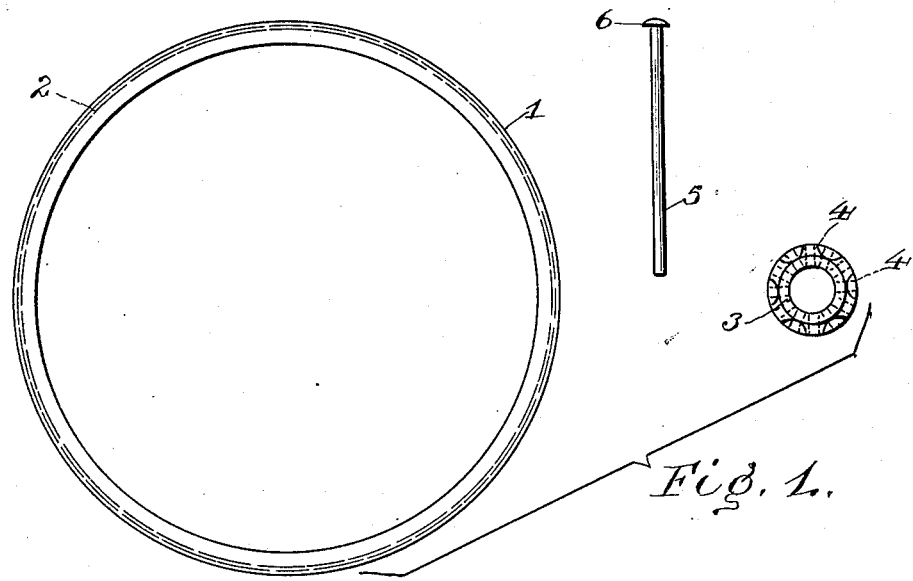
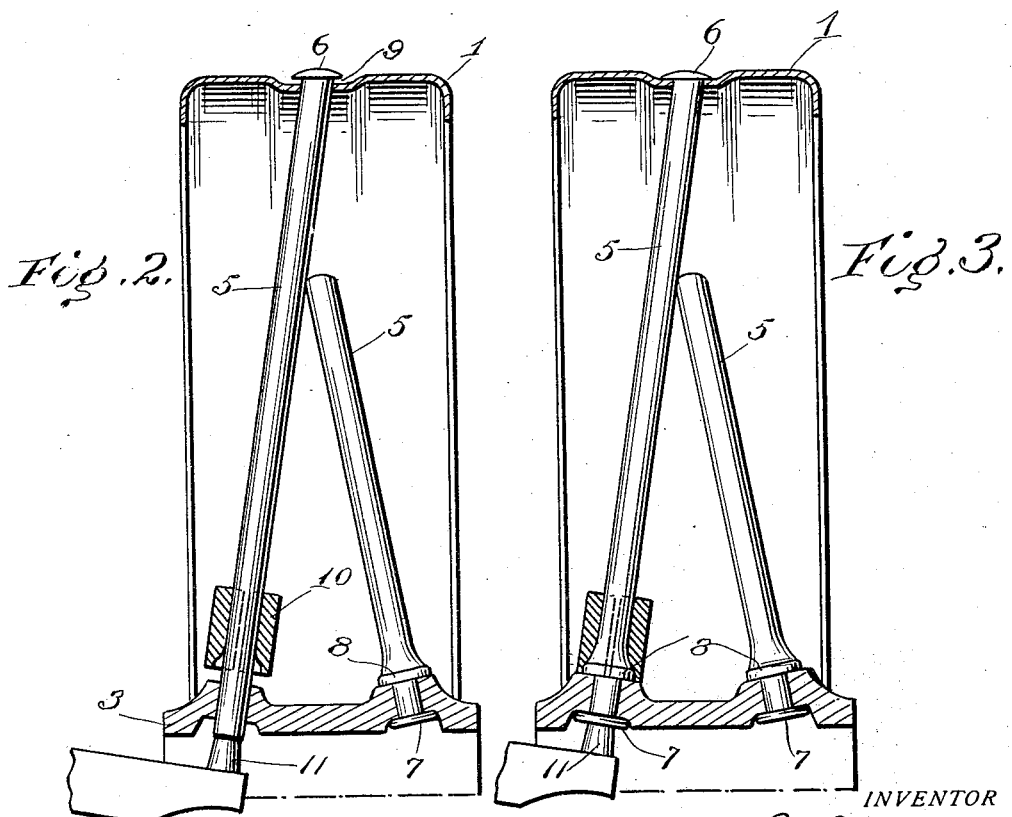

April 18, 1933.  J. L. HECHT  1,904,458

METHOD OF MAKING TENSION WHEELS

Filed Nov. 13, 1931    2 Sheets-Sheet 2

INVENTOR.
Joseph L. Hecht
BY
Morrison, Kennedy & Campbell
ATTORNEY.

Patented Apr. 18, 1933

1,904,458

UNITED STATES PATENT OFFICE

JOSEPH L. HECHT, OF DAVENPORT, IOWA, ASSIGNOR TO FRENCH & HECHT, INCORPORATED, A CORPORATION OF IOWA

METHOD OF MAKING TENSION WHEELS

Application filed November 13, 1931. Serial No. 574,687.

This invention relates to the manufacture of metal wheels, and has particular reference to the production of metal wheels in which the spokes are under tension to form a tension wheel; and the invention consists of a method of procedure in which a spoke provided with a head at one end, is inserted through corresponding spoke holes in a closed rim member and a hub member, and is positioned relatively to said members so that the head on the spoke will be spaced a slight distance from the adjacent surface of the associated member, the opposite end of the spoke being upset endwise so as to firmly connect the same to the other wheel member, and in which operation, the head at the opposite end of the spoke, will be caused to move up to and seat against the wheel member at that end and thereby place the spoke under tension.

In the specification to follow, the invention will be described in detail, and the novel features will be set forth in the appended claims.

In the accompanying drawings:

Fig. 1 is a view in side elevation, showing the disassembled parts or members of a wheel of a form suitable for practicing the improved method;

Fig. 2 is a sectional view on an enlarged scale of a portion of a wheel, showing one spoke positioned in the rim and hub preparatory to being fastened in place in accordance with the invention, and showing another spoke as it appears when in final connected condition; and Fig. 3 is a view similar to Fig. 2, showing the final condition of the unfastened spoke of Fig. 2 after being operated on in accordance with the invention.

Figure 4:
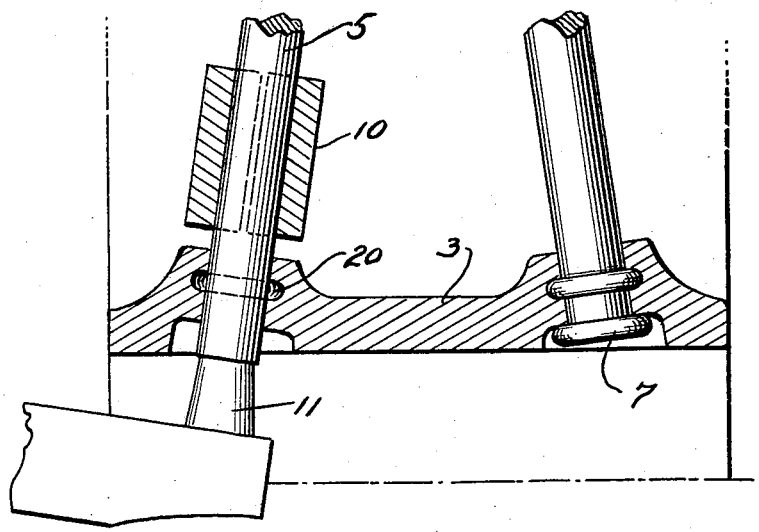
Figure 5:
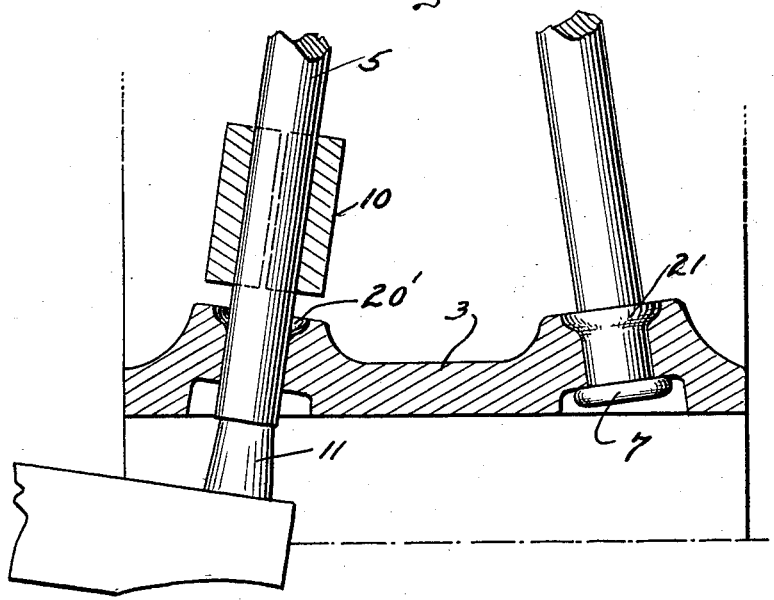

Figs. 4 and 5 are sectional views similar to Fig. 2, showing hub structures of a different character to which the method of the invention is applicable.

Referring to the drawings:

In making a wheel in accordance with the invention, I provide a closed rim member 1, in which are formed spoke holes 2, a hub member 3, provided with corresponding spoke holes 4, and a series of spokes 5, each having at one end a head 6, all as shown in Fig. 1. The hub is assembled concentrically within the rim, and by suitable means, not necessary here to illustrate, these two members of the wheel are supported fixedly in this relation so that they may be turned around as a unit to present the spokes in succession to the action of the spoke fastening means later to be described.

Fig. 2 shows one spoke at the right, fastened in place by means of a head 7 on its inner end bearing tightly against the inner side or surface of the hub, and an annular shoulder 8 on the spoke near its inner end bearing against the outer side of the hub, and the figure shows another spoke at the left positioned in the rim and hub, preparatory to the formation of the said fastening head 7 and shoulder 8.

In assembling and fastening the spoke in this manner, the headless end of the spoke is passed inwardly through a hole 2 in the rim, and through the corresponding hole 4 in the hub, and the spoke is so positioned relatively to these parts, that the head 6 on its outer end will be spaced a slight distance, as at 9, from the outer side of the rim, while its inner headless end will project some distance inwardly beyond the inner side of the hub, said headless end of the spoke being preferably heated before or after its assemblage in place. An upsetting clamp 10 is now applied to the heated spoke outside the hub, and at a short distance therefrom, and an upsetting head 11 is engaged with the inner heated end of the spoke within the hub, and these two upsetting members are, by a suitable means, moved toward each other with powerful pressure, while engaged with the spoke end, with the result that the end of the spoke will be upset endwise, and the head 7 will be formed on the inner end of the spoke in tight and forcible engagement with the inner side of the hub, and the shoulder 8 will be formed on the spoke outside the hub and disposed in firm and forcible engagement with the hub at this point, thereby firmly fastening the inner end of the spoke to the hub. In the upsetting action, the material of the spoke going into the formation of the head 7 and shoulder 8, causes a shortening of the spoke and draws the head 6 on the outer end of the same up to the outer surface of the rim and seats the same tightly and firmly thereagainst, as clearly shown in Fig. 3, and the extent of shortening is such that it will act, after the head 6 becomes seated, and in connection with the contraction of the metal of the spoke on cooling, to place the spoke under tension of the proper degree. After a spoke has been thus fastened in place and tensioned, the upsetting members are disengaged from the fastened spoke, and a new spoke with its headless end heated is positioned in the holes in the rim and hub, and the connected rim and hub are turned to present the end of the new spoke to the upsetting members, which being engaged as before with the heated spoke end, the foregoing upsetting operation is repeated, and so on until all of the spokes are fastened in place under uniform tension.

The positioning of the spoke preparatory to the upsetting operation, with its head spaced from the adjacent surface of the associated wheel member (in the example shown, the rim 1), is of great importance and advantage in practicing my invention, as it prevents, in the shortening of the spoke in the upsetting operation and the contraction of the spoke on cooling, the undue stretch of the spoke and consequently too great tension thereon, the clearance space 9, enabling the spoke to shorten up considerably, before the tension begins to act as the head seats against the rim. If the upsetting operation were initiated with the spoke head 6 already seated, the shortening of the spoke would begin at once, and as such shortening is very considerable, the spokes would be unduly tensioned, with the liability of deforming the rim and weakening the finished wheel.

It will be understood that it is not essential to the practice of the invention that, in the fastening of the free end of the spoke to the adjacent wheel member, there be formed both a head on the end of the spoke to bear against one side of the wheel member, and an adjacent shoulder to bear against the other side of the wheel member, since it is obvious that the spoke may be fastened by an upsetting action to the wheel member in other ways. For instance, the end of the spoke may be headed and the spoke stock caused by the heading operation, to expand laterally and tightly fill the spoke hole, or an enlarged portion of the same, whereby the spoke will be shortened as before, and this shortening in connection with the contraction of the spoke on cooling, will draw the head against the other member of the wheel and place the spoke under tension, at the same time affording a firm and secure connection of the spoke with the wheel, and without provision of the external shoulder, as previously described. Thus as shown in Fig. 4, the spoke holes may be provided with an enlarged portion 20 positioned approximately midway between the outer and inner ends of the spoke hole, this recess being adapted to receive the upset metal of the spoke 5 when it is acted upon by the clamp 10 and the upsetting head 11. At the right of this figure, a portion of a completed spoke is shown formed in accordance with this method of the invention. In Fig. 5 a recess 20' is formed in the hub at the outer end of the spoke hole, the upset metal of the hub in this case forming a flange 21 which, together with the head 7, holds the spoke firmly in position. In this case the outer surface of the flange is flush with the outer face of the hub.

While in the foregoing description I have described in the preferable method of procedure, the heating of the headless end of the spoke in order to facilitate its heading in its connection to the wheel member, and in order to set up a tension on the spokes under the most favorable conditions, as when the spoke contracts on cooling, it will be understood that the invention is not limited to this heating of the spoke end, but embraces as well the cold working of the parts, i. e., the spokes could be fastened in place by upsetting without previously heating the end on which the upsetting tool acts, and a tension could be in this manner applied to the spokes, although not with the same facility and readiness and practicability as when the spoke ends are heated.

Having thus described my invention, what I claim is:—

1. In the method of making tension wheels, assembling a hub member provided with spoke holes, concentrically within a closed rim member provided with corresponding spoke holes, providing spokes having a head at one of their ends, inserting the headless end of a spoke through corresponding holes in said members, positioning said spoke with its head spaced a short distance from the adjacent surface of the adjacent wheel member, and acting on the opposite end of the spoke to fasten it rigidly to the wheel member at that end while causing said spoke in the fastening operation to shorten and the head on the other end of the spoke to move up to and seat tightly against the surface of the wheel member at that end and thereby tension the spoke.

2. In the method of making tension wheels, assembling a hub member provided with spoke holes, concentrically within a closed rim member provided with corresponding spoke holes, providing spokes having a head at one of their ends, inserting the headless end of a spoke through corresponding holes in said members, positioning said spoke with its head spaced a short distance from the adjacent surface of the adjacent wheel member, and upsetting the opposite end of the spoke to form a head thereon seated against one surface of the adjacent wheel member, and a shoulder seated against the opposite surface of said member, while causing the head on the opposite end of the spoke to move up to and seat tightly against the surface of the wheel member at that end, and thereby tension the spoke.

3. The method of making tension wheels, which consists in assembling a hub member provided with spoke holes, concentrically within a closed rim member provided with corresponding spoke holes, providing spokes having a head at one of their ends, inserting the headless end of a spoke through corresponding holes in said members, positioning said spoke with its head spaced a short distance from the adjacent surface of the adjacent wheel member, and upsetting the opposite end of the spoke while heated to fasten it rigidly to the wheel member at that end, whereby the spoke on shortening will cause the head on its opposite end to move up to and seat tightly against the surface of the wheel member at that end, thereby tensioning the spoke, and repeating these operations on the remainder of the spokes to place the same under tension and complete the wheel.

In testimony whereof, this specification has been duly signed by:

JOSEPH L. HECHT.